(12) United States Patent
Lin (10) Patent No.: US 8,909,598 B2
(45) Date of Patent: Dec. 9, 2014

(54) METHOD FOR MANAGING ELECTRONIC PHONE BOOK USED IN COMMUNICATION DEVICES

(71) Applicant: Chi Mei Communication Systems, Inc., New Taipei (TW)

(72) Inventor: Wei-Ling Lin, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 104 days.

(21) Appl. No.: 13/734,941

(22) Filed: Jan. 5, 2013

(65) Prior Publication Data

US 2013/0262375 A1     Oct. 3, 2013

(30) Foreign Application Priority Data

Mar. 27, 2012 (TW) .............................. 101110494 A (51) Int. Cl.
*G06F 17/30* (2006.01)
*H04M 1/2745* (2006.01)
*H04M 1/725* (2006.01)

(52) U.S. Cl.
CPC ..... *G06F 17/30345* (2013.01); *H04M 1/72552* (2013.01); *G06F 17/30377* (2013.01); *H04M 1/274533* (2013.01)
USPC .......................................... 707/609; 707/741

(58) Field of Classification Search
USPC .................................................. 707/609, 741
See application file for complete search history.

(56) References Cited

U.S. PATENT DOCUMENTS

| | | | | |
|---|---|---|---|---|
| 6,981,023 | B1 * | 12/2005 | Hamilton et al. | 709/206 |
| 6,987,963 | B2 * | 1/2006 | Kouznetsov et al. | 455/414.1 |
| 7,392,043 | B2 * | 6/2008 | Kouznetsov et al. | 455/418 |
| 7,735,002 | B2 * | 6/2010 | Hong et al. | 715/234 |
| 8,224,397 | B2 * | 7/2012 | Espersen et al. | 455/569.1 |
| 8,480,471 | B2 * | 7/2013 | Lutnick et al. | 463/17 |
| 8,522,257 | B2 * | 8/2013 | Rupp et al. | 719/318 |
| 8,566,329 | B1 * | 10/2013 | Freed et al. | 707/748 |
| 8,676,273 | B1 * | 3/2014 | Fujisaki | 455/567 |
| 8,758,109 | B2 * | 6/2014 | Lutnick | 463/16 |

\* cited by examiner

*Primary Examiner* — Kim Nguyen
(74) *Attorney, Agent, or Firm* — Novak Druce Connolly Bove + Quigg LLP (57) ABSTRACT

A method for managing an electronic phone book is used in a communication device which includes a universal subscriber identity module (USIM), a system for executing the method, a storage device, and a processor. The USIM includes elementary files. The system and the method identify information updated by users for saving the electronic phone book, a contact name, a contact phone number, and a contact email address according to link information of each elementary file. The system and the method update the contact information of USIM according to the information updated by the users. The contact information of USIM can be quickly updated by utilizing the method and the system.

16 Claims, 11 Drawing Sheets

METHOD FOR MANAGING ELECTRONIC PHONE BOOK USED IN COMMUNICATION DEVICES

BACKGROUND

1. Technical Field

The present disclosure is related to electronic phone books, and is especially relative to a method for managing an electronic phone book of a universal subscriber identity module used in a communication device.

2. Description of Related Art

A Universal subscriber identity module (USIM) can be used in a cell phone of the third generation mobile telecommunications (3G) specification. The USIM provides a variety of use, but the use of the electronic phone book is different from the use of the subscriber identity module (SIM) in a mobile phone of the global system for mobile communications (GSM) specification.

When users want to modify contact information using an interface provided by a cell phone, the cell phone loads the information of the electronic phone book from USIM, receives the information updated by the users, and compares the received information with the information of the electronic phone book one by one to update the information. This method wastes a lot of time and resources.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. Some non-limiting examples of non-transitory computer-readable storage medium include CDs, DVDs, flash memory, and hard disk drives.

Figure 1:
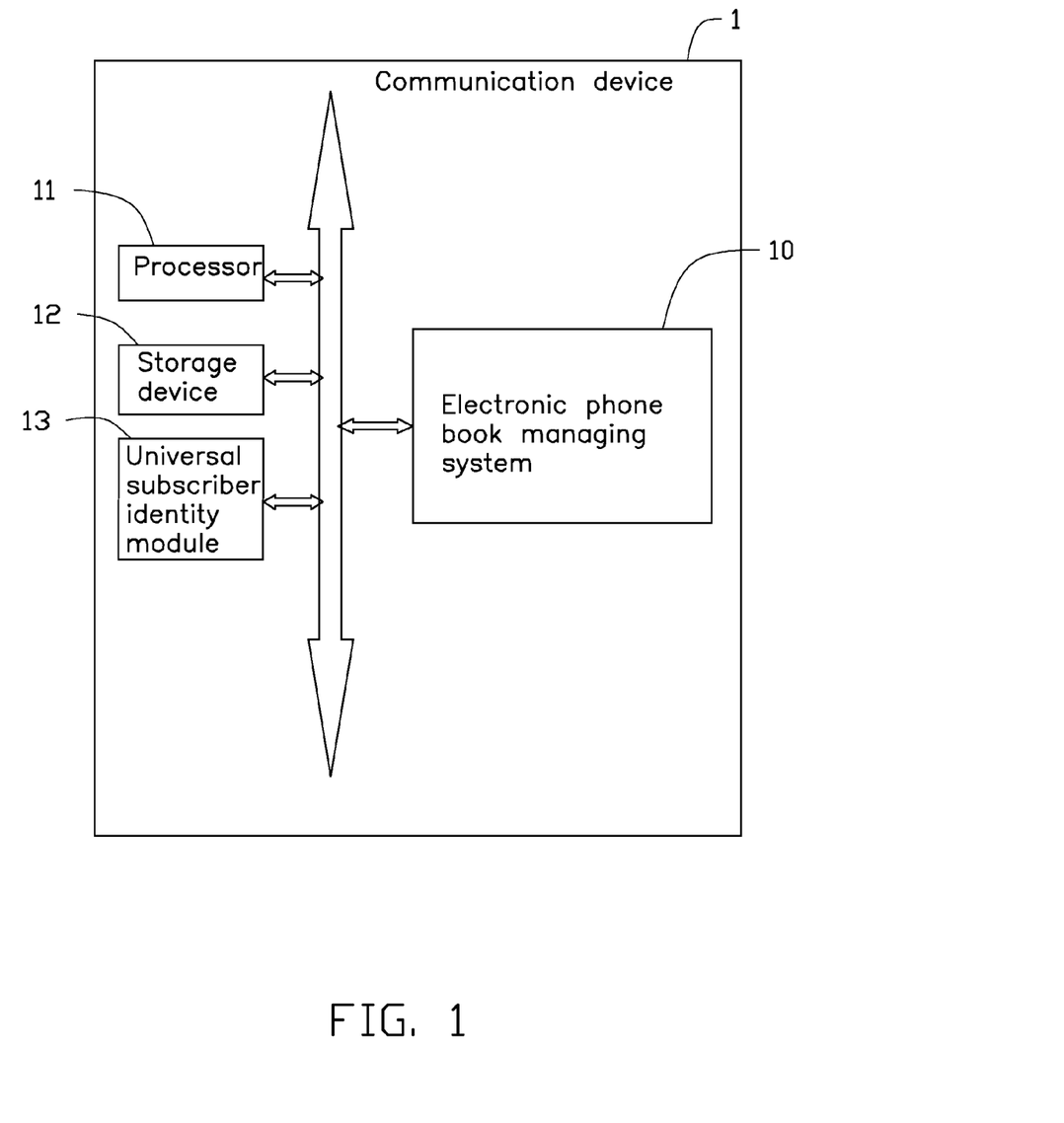
FIG. 1 is an application environment drawing of one embodiment.

FIG. 1 is an application environment drawing of one embodiment of a communication device 1 including an electronic phone book managing system 10. In the embodiment, the electronic phone book managing system 10 is installed and implemented by the communication device 1 which may be a cell phone, a personal digital assistant (PDA), a computer, and the like. The communication device 1 may further include a processor 11, a storage device 12, and a universal subscriber identity module (USIM) 13.

The electronic phone book managing system 10 may include a plurality of functional modules that are stored in the storage device 12 and executed by processor 11. The electronic phone book managing system 10 manages an electronic phone book for loading, saving, and updating the electronic phone book stored in the USIM 13 of the communication device 1.

The processor 11 executes a plurality of software saved in the communication device 1, for example an operation system of the communication device 1 and the electronic phone book managing system 10 which implements a method for managing the electronic phone book. The storage device 12 may be a memory of the communication device 1 or an external storage card of the communication device 1, such as a smart media card (SM card), a secure digital card (SD card), for example. The storage device 12 saves information, an electronic phone book, an email, for example, and information obtained or set by the method for managing the electronic phone book.

Figure 2:
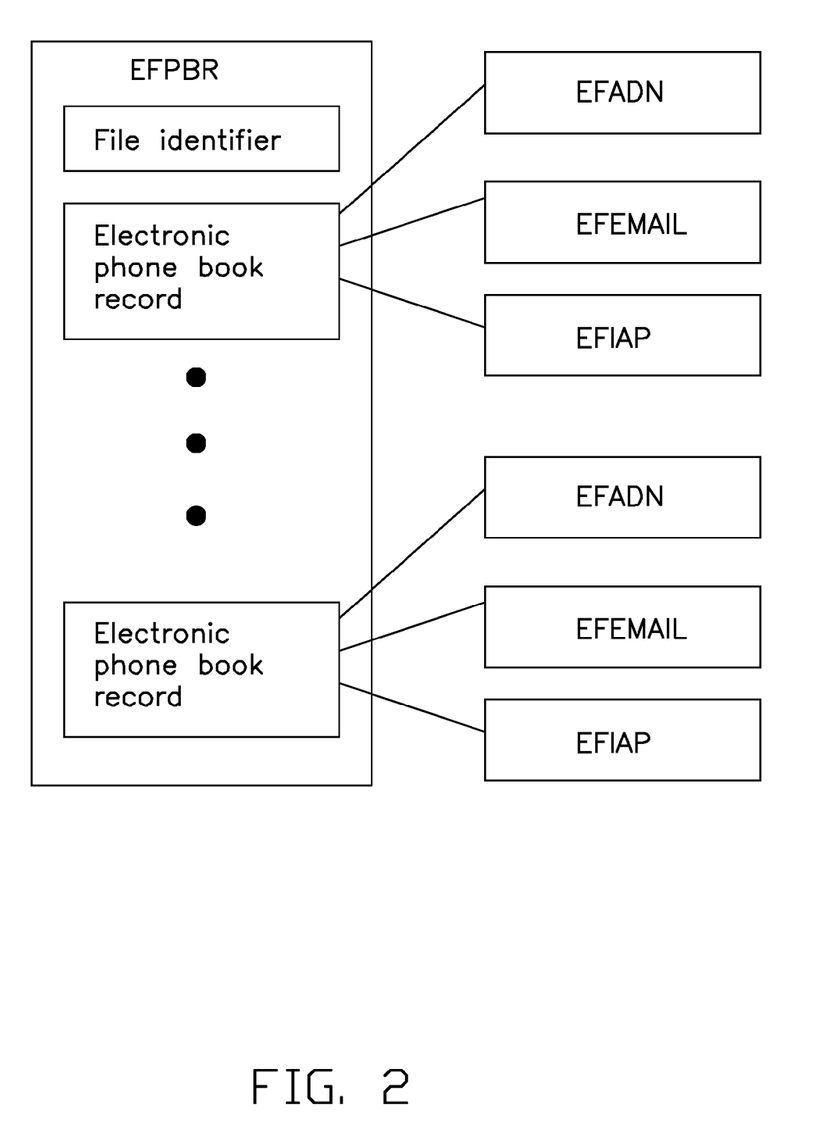
FIG. 2 is a schematic drawing of elementary files (EF) in USIM of one embodiment.

FIG. 2 is a schematic drawing of elementary files stored in the USIM 13 of one embodiment. In the embodiment, the USIM 13 loads, saves, and manages the electronic phone book by the elementary files. For example, the elementary files include an elementary file phone book reference (EFPBR), a plurality of elementary file abbreviated dialing numbers (EFADN), a plurality of elementary file email (EFEMAIL), and a plurality of elementary file index administration pointer (EFIAP). The EFPBR provides a plurality of electronic phone book records. The EFADN provides a plurality of name and phone number records. The EFEMAIL provides a plurality of email records. The EFIAP provides a plurality of index records.

The EFPBR includes the electronic phone book records, and each electronic phone book record includes a plurality of contact records, for example the number of the contact records may be two-hundred-fifty-four. Each electronic phone book record corresponds to an EFADN, an EFEMAIL, and an EFIAP for recording information of each contact in the electronic phone book record.

Each of the elementary files includes a file identifier (file ID), for example, the file ID of EFADN may be 6F3A or 4F3A. The following explains content of the elementary files and use of the elementary files one by one.

Figure 3:
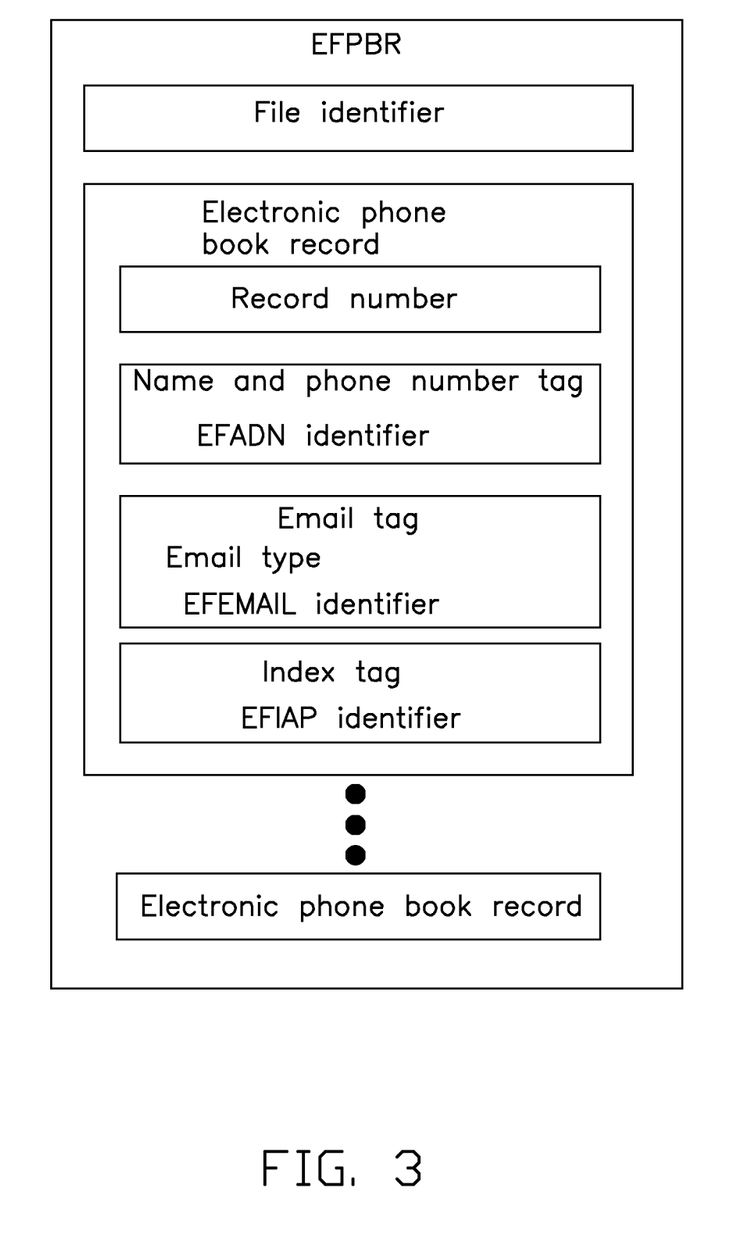
FIG. 3 is a schematic drawing of an elementary file phone book reference (EFPBR) stored in USIM of one embodiment.

FIG. 3 is a schematic drawing of the EFPBR stored in the USIM 13 of one embodiment. The EFPBR includes a file ID and a plurality of electronic phone book records, wherein each electronic phone book record includes a record number, a name and phone number tag, an email tag, and may includes an index tag.

The name and phone number tag provides the file ID of the EFADN corresponding to the electronic phone book record. The email tag provides the file ID of the EFEMAIL and an email type of the EFEMAIL (the following explains working principles according to FIG. 8A, FIG. 8B, and FIG. 8C). The index tag provides the file ID of EFIAP corresponding to the electronic phone book record.

Figure 4:
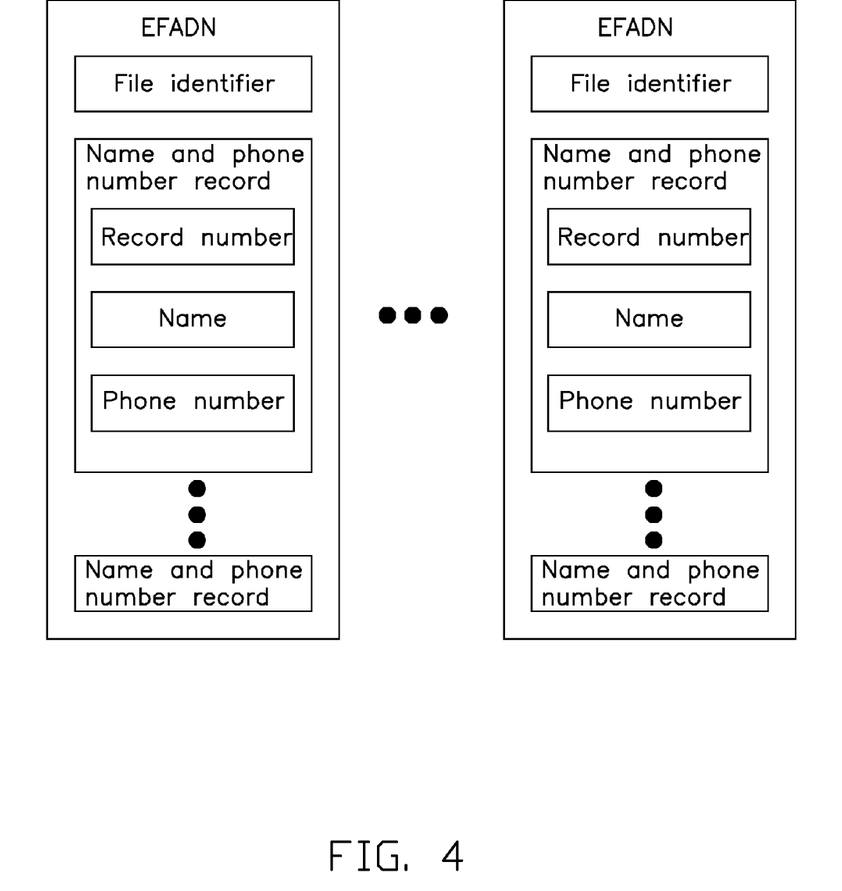
FIG. 4 is a schematic drawing of an elementary file abbreviated dialing numbers (EFADN) stored in USIM of one embodiment.

FIG. 4 is a schematic drawing of the EFADN stored in the USIM 13 of one embodiment. Each of the EFADN provides a file ID and a plurality of name and phone number records, wherein each of the name and phone number records provides a record number of the name and phone number record, a name of the contact, and a phone number of the contact.

Figure 5:
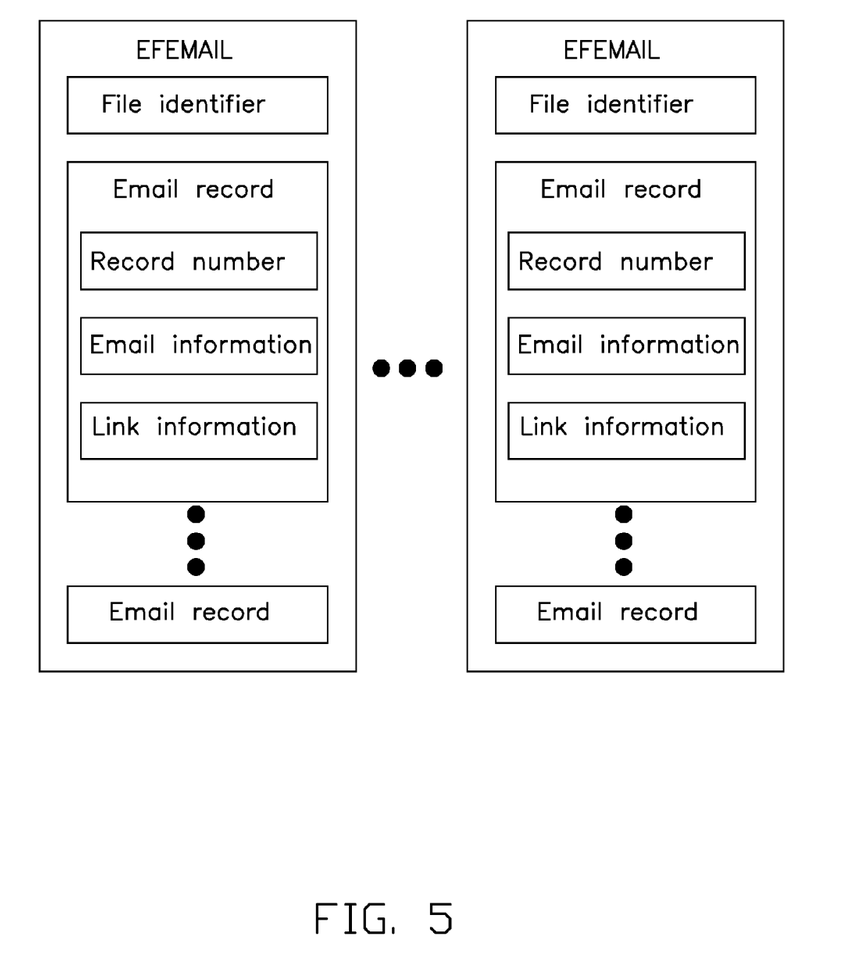
FIG. 5 is a schematic drawing of an elementary file email (EFEMAIL) stored in USIM of one embodiment.

FIG. 5 is a schematic drawing of the EFEMAIL stored in the USIM 13 of one embodiment. Each EFEMAIL provides a file ID and a plurality of email records, wherein each of the email records provides the record number of the email record, the email information (an email address) of the contact, and link information.

The link information of the EFEMAIL is corresponding relationship for matching the name and phone number record of the EFADN with the email record of the EFEMAIL.

Figure 6:
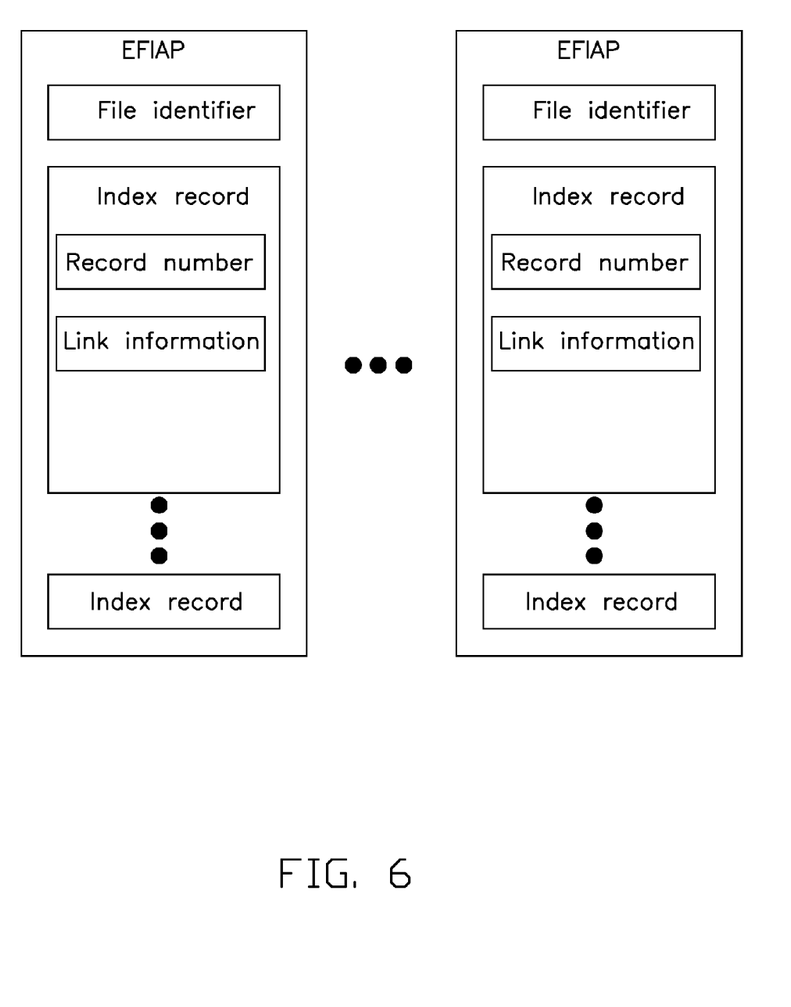
FIG. 6 is a schematic drawing of an elementary file index administration pointer (EFIAP) stored in USIM of one embodiment.

FIG. 6 is a schematic drawing of the EFIAP stored in the USIM 13 of one embodiment. Each of the EFIAP provides a file ID and a plurality of index records. Each of the index records provides a record number of the index record and link information. The link information of the index record provides a corresponding relationship for matching the name and phone number record of the EFADN and the email record of the EFEMAIL. For example, a fifth name and phone number record provides a record of a name of Andy and his phone number, and the fifth email record of the EFEMAIL provides an email address of abc@def.gh of Andy. Each of the EFIAP includes an index record which provides the link information of the index record for easily searching the records of the same contact and easily loading, saving, and updating the contact information.

Figure 7A:
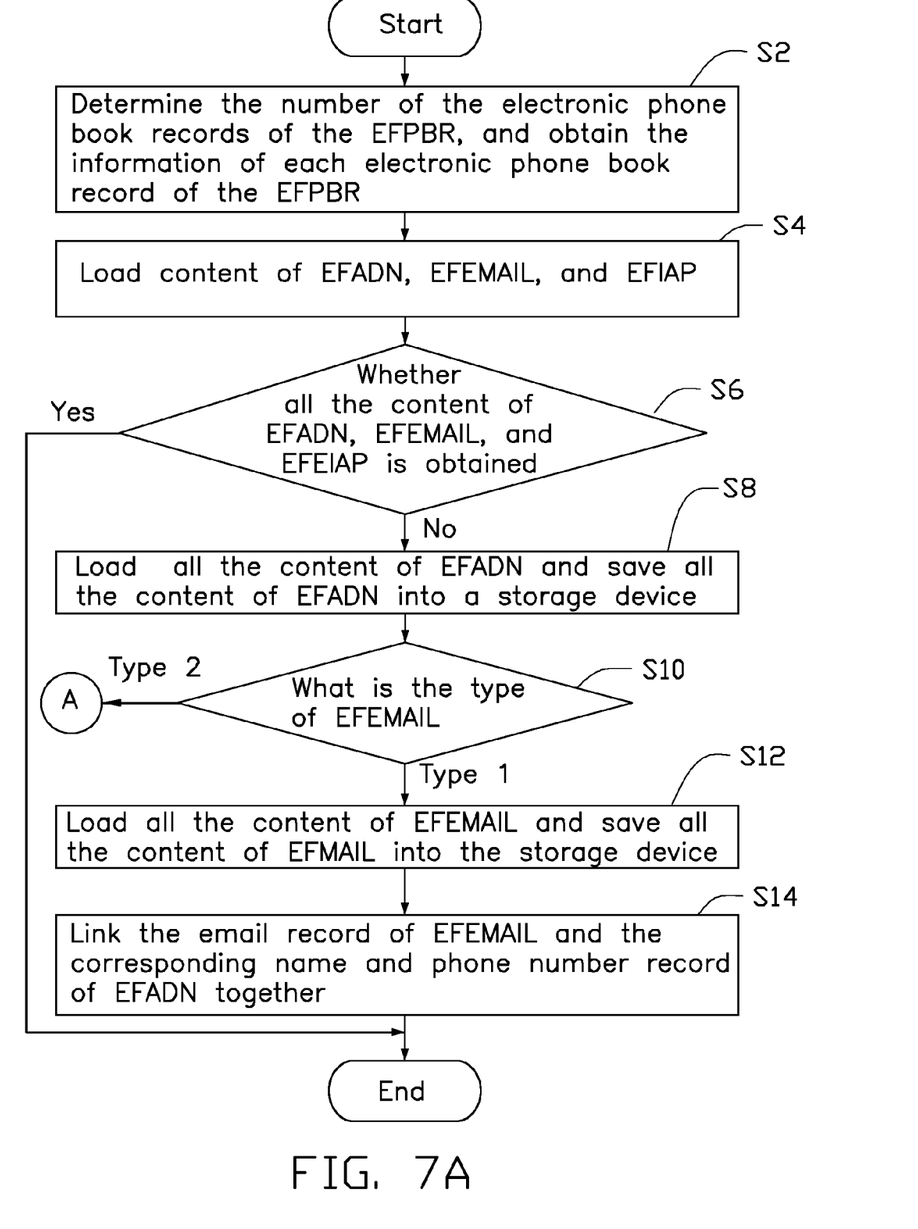
FIG. 7A and FIG. 7B are flowcharts for loading electronic phone book information of one embodiment.
Figure 7B:
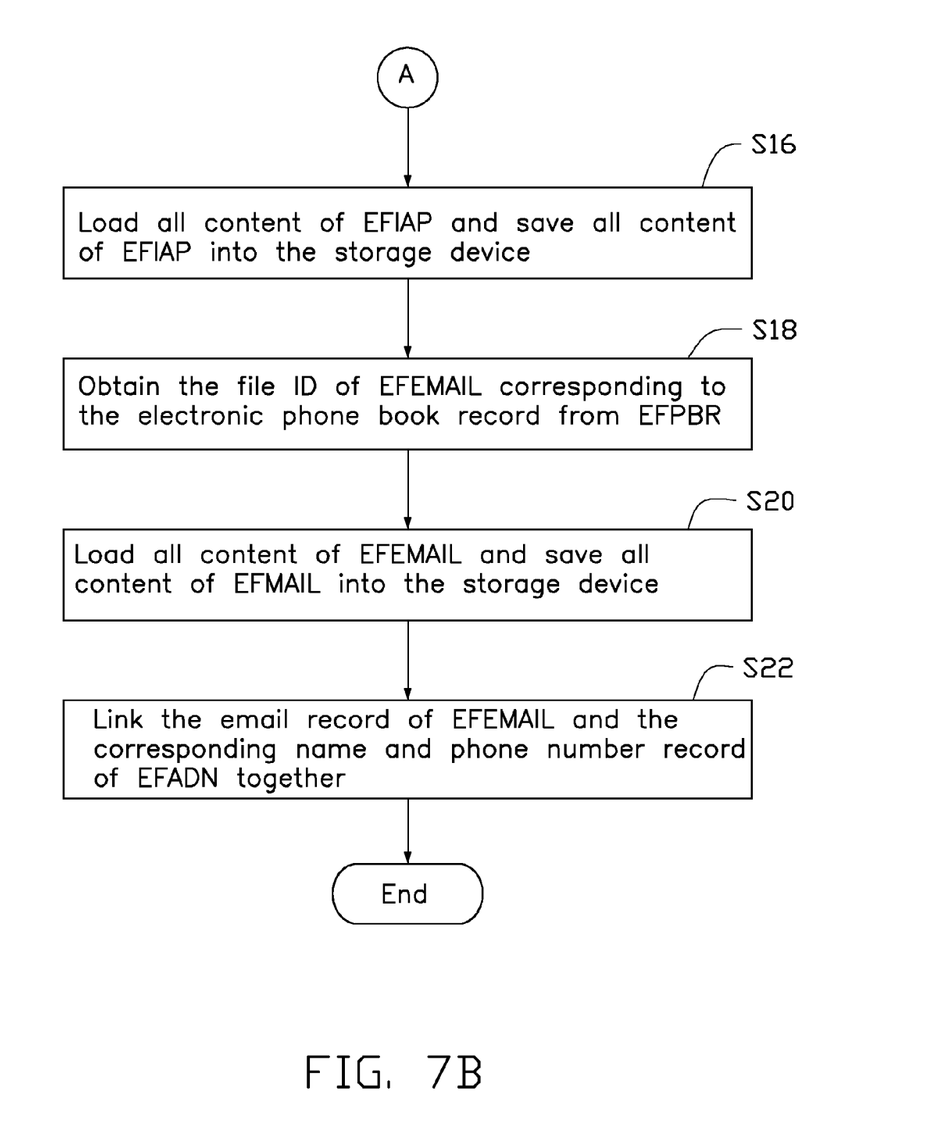

FIG. 7A and FIG. 7B are flowcharts for loading electronic phone book information of one embodiment. The following steps can be executed by the electronic phone book managing system 10.

In step S2, the number of the electronic phone book records of the EFPBR is determined, and the information of each electronic phone book record of the EFPBR which includes the name and phone number tag, the email tag, and the index tag corresponding to each electronic phone book record is obtained. The name and phone number tag provides the file ID of the EFADN, and the email tag provides the file ID of the EFEMAIL and the email type of the EFEMAIL, and the index tag provides the file ID of the EFIAP, and then step S4 is implemented.

To clearly understand, the following provides an electronic phone book record, a corresponding the EFADN file, a corresponding the EFEMAIL file, and a corresponding the EFIAP for example.

In step S4, a corresponding content of the EFADN, the EFEMAIL, and the EFIAP is loaded according to the file ID of the EFADN, the EFEMAIL, and the EFIAP obtained by the electronic phone book record, and then step S6 is implemented.

In step S6, determining whether all the content of the EFADN, the EFEMAIL, and the EFEIAP is obtained by determining the content of the EFADN, the EFEMAIL, or the EFEIAP for an empty content.

When all the content of the EFADN, the EFEMAIL, and the EFEIAP is obtained, all the information of the electronic phone book from USIM is obtained, and then the flow process is ending.

When all the content of the EFADN, the EFEMAIL, and the EFEIAP is not obtained, step S8 is implemented. In step S8, all the content of the EFADN includes the file ID of the EFADN and each name and phone number record of the EFADN. All the content is loaded and saved into the storage device 12 according to the file ID of the EFADN, and then step S10 is implemented. For example, the EFPBR may include a plurality of electronic phone book records. The electronic phone book record of the EFPBR corresponding to the EFADN can be determined according to the file ID of EFADN.

In step S10, the type of EFEMAIL is determined by an email type recorded in the email tag of the electronic phone book record of the EFPBR. In the embodiment, the email type includes type one and type two. The type one expresses that a number of the email records of the EFEMAIL is equal to a number of the name and phone number records of the EFADN. The type two expresses that the number of the email records of the EFEMAIL is not equal to the number of the name and phone number records.

When the email type of the EFEAMIL is type one, step S12 is implemented. In step S12, all content of EFEAMIL includes the file ID of the EFEMAIL, the email records of the EFEMAIL, and the record number of the electronic phone book record of the EFPBR corresponding to the EFEMAIL. All the content is loaded and saved into the storage device 12, and then step S14 is implemented.

In step S14, each email record of the EFEMAIL and the corresponding name and phone number record of the EFADN are linked together according to the link information of the EFEMAIL included in the email record of the EFEMAIL, and then the flow process is ending. The name and phone number record of the EFADN and the email record of the EFEMAIL of the same contact are linked together for easily searching, loading, and updating.

When the email type of the EFEAMIL is type two, step S16 is implemented. In step S16, all content of the EFIAP includes the file ID of the EFIAP and each index record of the EFIAP, and all the content of the EFIAP is loaded and saved into the storage device 12. The index record of the EFIAP provides the link information of the EFIAP for matching the name and phone number record of the EFADN and the email record of the EFEMAIL, and then step S18 is implemented. For example, one of the index records of the EFIAP provides link information that the fifth name and phone number record and the fourth email record of the EFEMAIL are belonging to the same contact.

In step S18, the file ID of the EFEMAIL corresponding to the electronic phone book record is obtained from the EFPBR, and then step S20 is implemented.

In step S20, all content of the EFEAMIL includes the file ID of the EFEMAIL, the email records of EFEMAIL, and the record number of the electronic phone book record of the EFPBR corresponding to the EFEMAIL file. All the content of the EFEMAIL is loaded and saved into the storage device, and then step S22 is implemented.

In step S22, each email record of the EFEMAIL and the corresponding name and phone number record of the EFADN are linked together according to the link information of EFEMAIL included in the email record of EFEMAIL, and then the flow process is ending.

Figure 8A:
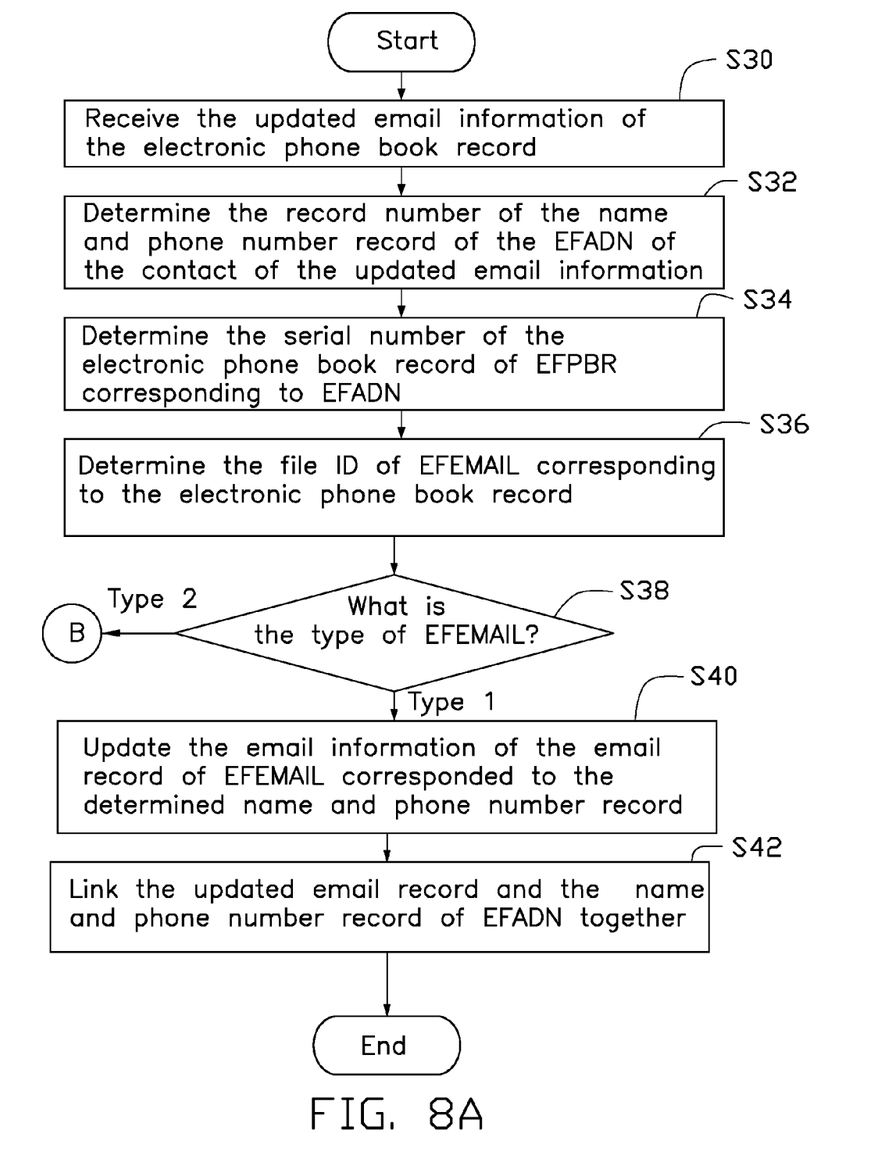
FIG. 8A, FIG. 8B, and FIG. 8C are flowcharts for updating electronic phone book information of one embodiment.
Figure 8B:
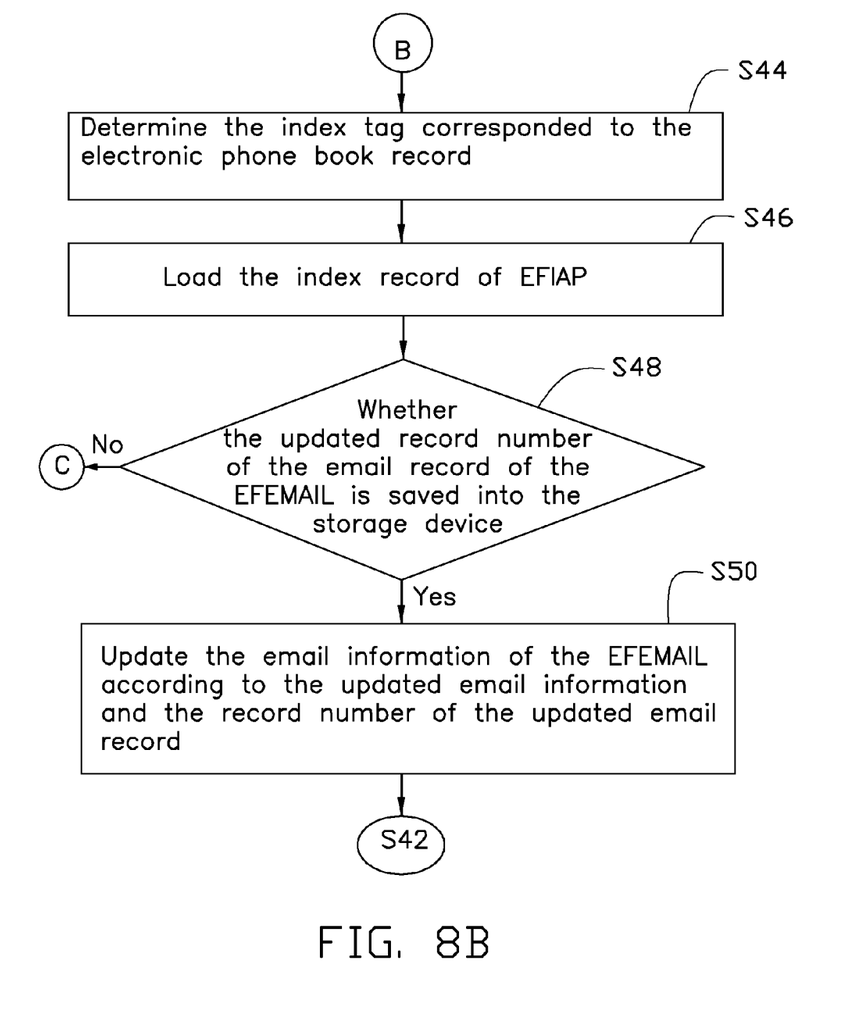
Figure 8C:
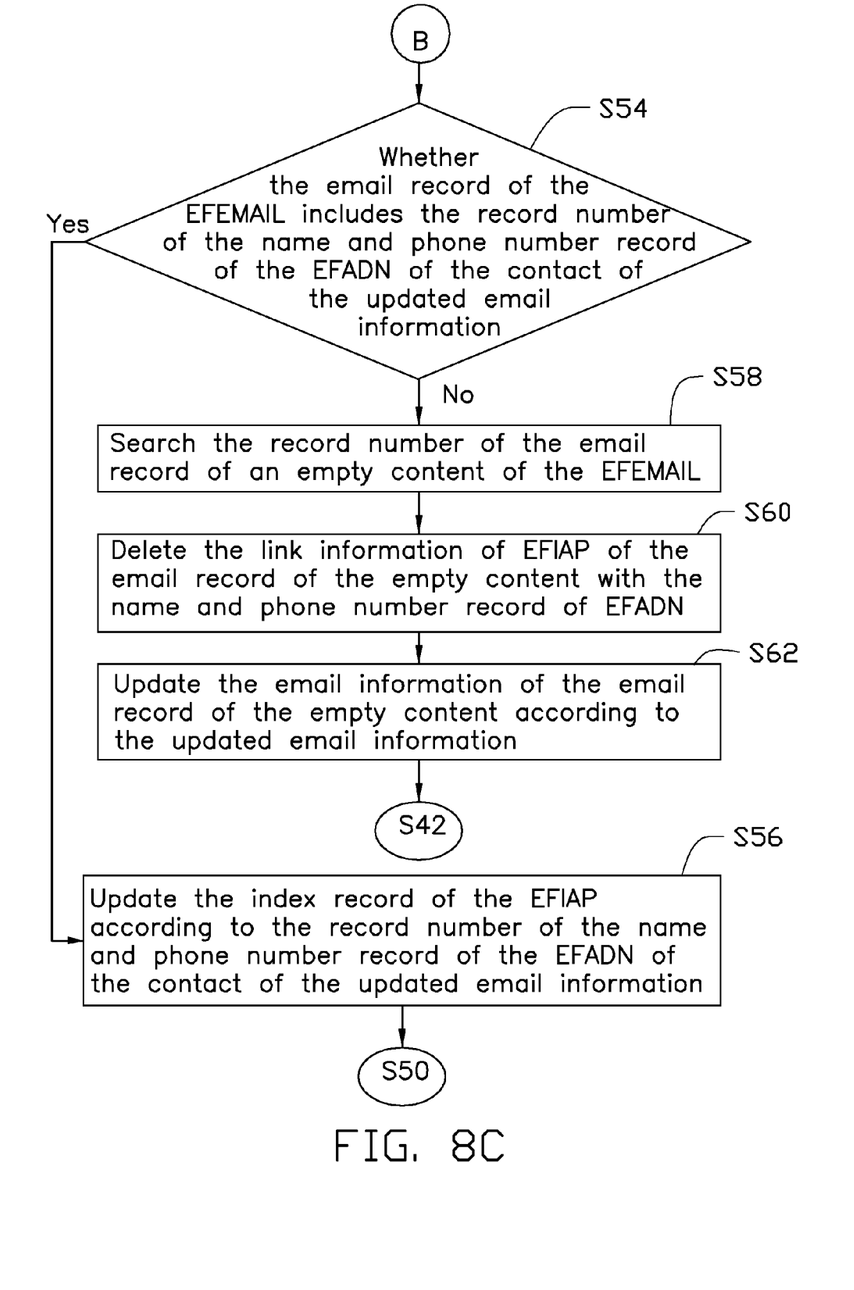

FIG. 8A, FIG. 8B, and FIG. 8C are flowcharts for updating electronic phone book information of one embodiment.

In step S30, the updated email information of the electronic phone book record is received. In the embodiment, the received information is the information updated by the users according to a user interface of the communication device 1, and then step S32 is implemented.

In step S32, the record number of the name and phone number record of the EFADN of the contact of the updated email information is determined The file ID of the EFADN is determined, and then step S34 is implemented.

In step S34, the record number of the electronic phone book record of the EFPBR corresponding to the EFADN is determined according to the file ID of the EFADN, and then step S36 is implemented.

In step S36, the file ID of the EFEMAIL corresponding to the electronic phone book record is determined according to the determined record number of the electronic phone book record and the email tag corresponding to the electronic phone book record, and then step S38 is implemented.

In step S38, determining which type is the email type of the EFEMAIL according to the email type recorded in the email tag of the electronic phone book record of the EFPBR.

When the email type of the EFEMAIL is type one, step S40 is implemented. In step S40, the email information of the email record of EFEMAIL corresponding to the determined name and phone number record is updated according to the file ID of the EFEMAIL and the updated information, and then step S42 is implemented.

In step S42, the updated email record and the name and phone number record of the EFADN are linked together, and then the flow process ends. The email record before updating and the name and phone number of the EFADN may be linked together already, but the email record is updated, and link information is deleted after updating. Therefore, the email record of the EFEMAIL and the name and phone number of the EFADN are needed to be linked together again.

When the email type of the EFEMAIL is type two, step S44 is implemented. In step S44, the index tag corresponded to the electronic phone book record is determined according to the determined record number of the electronic phone book record of the EFPBR, and then step S46 is implemented.

In step S46, the index record of the EFIAP is loaded according to the determined file ID of the EFIAP, and then step S48 is implemented.

In step S48, determining whether the updated record number of the email record of the EFEMAIL is saved into the storage device 12 according to the loaded index record and the record number of the name and phone number record of the EFADN of the contact of the updated email information determined in step S32. The index record provides the link information of the EFADN with the EFEMAIL. Therefore, the record number of the name and phone number record of the EFADN of the contact of the updated email information is determined, and the record number of the corresponding email record of the EFEMAIL is determined according to the link information of the EFIAP.

When the record number of the updated email record is saved in the storage device 12, and then step S50 is implemented. In step S50, the email information of the EFEMAIL is updated according to the updated email information and the record number of the updated email record, and then step S42 is implemented.

When the record number of the updated email record is not saved in the storage device 12, step S54 is implemented. In step S54, determining whether the email record of the EFEMAIL includes the record number of the name and phone number record of the EFADN of the contact of the updated email information. The email record of the EFEMAIL provides the link information of the EFEMAIL for the name and phone number record corresponded to the email record. For example, the link information of the EFEMAIL may be the name or phone number of the contact, or the record number of the name and phone number record of the EFADN corresponded to the updated email record.

When the email record of the EFEMAIL includes the record number of the name and phone number of the EFADN of the contact of the updated email information, step S56 is implemented. In step S56, the index record of the EFIAP is updated according to the record number of the name and phone number record of the EFADN of the contact of the updated email information, and then step S50 is implemented.

When the email record of the EFEMAIL does not include the record number of the name and phone number of the EFADN of the contact of the updated email information, step S58 is implemented. In step S58, a record number of the email record of an empty content of the EFEMAIL is searched, and then step S60 is implemented.

In step S60, the link information of EFIAP of the email record of the empty content of the EFEMAIL with the name and phone number record of the EFADN is deleted, and then step S62 is implemented.

In step S62, the email information of the email record of the empty content is updated according to the updated email information, and then step S42 is implemented.

Depending on the embodiment, some of the steps described may be removed, others may be added, and the sequence of the steps may be altered. It is also to be understood that the description and the claims drawn to a method may include some indication in reference to certain steps. However, the indication used is only to be viewed for identifier purposes and not necessarily as a suggestion as to an order for the steps.

All of the processes described above may be embodied in, and fully automated via, functional codes executed by one or more general purpose processors of computing devices. The functional codes may be stored in any type of non-transitory computer readable storage medium or other storage device. Some or all of the methods may alternatively be embodied in specialized hardware. Depending on the embodiment, the non-transitory computer readable storage medium may be a hard disk drive, a compact disc, a digital video disc, a tape drive or other suitable storage medium.

The present disclosure conforms to the patentability of inventions, and submits the application in conformity with patent law. The above disclosure is the preferred embodiment. Anyone of ordinary skill in this field can modify and change the embodiment in the spirit of the present disclosure, and all such changes or modifications are included in the scope of the following claims.

What is claimed is:

1. A computerized-method of a communication device for managing an electronic phone book, the communication device comprising a universal subscriber identity module (USIM) the method comprising steps:

saving the electronic phone book information loaded from the USIM into a storage device of the communication device, wherein the USIM comprises a plurality of elementary files, and the elementary files comprise an elementary file phone book reference (EFPBR), a plurality of elementary file abbreviated dialing numbers (EFADN) files, a plurality of elementary file email (EFEMAIL), and a plurality of elementary file index administration pointer (EFIAP), wherein the EFPBR comprise a plurality of electronic phone book records, a plurality of name and phone number tags, a plurality of email tags, and a plurality of index tags, wherein the EFADN comprise a plurality of name and phone number records, wherein the EFEMAIL comprise a plurality of email records, wherein the EFIAP comprise a plurality of index records;

receiving updated email information of contacts in the electronic phone book;

determining a record number of the name and phone number record of the EFADN of the contact of the updated email information, and determining a file identifier (file ID) of the EFADN;

determining a record number of the electronic phone book record of the EFPBR corresponding to the EFADN according to the file ID of the EFADN;

determining a file ID of the EFEMAIL corresponding to the electronic phone book record according to the email tag corresponding to the electronic phone book record and a determined record number of the electronic phone book record;

updating email information of the email record of the EFEMAIL corresponding to a determined name and phone number record according to the updated email information when determining a email type of the EFEMAIL for a first type according to the email type included in the electronic phone book record of the EFPBR, wherein the first type expresses that a number of the email records of the EFEMAIL is equal to a number of the name and phone number records of the EFADN; and linking an updated email record of the EFEMAIL with the name and phone number record of the EFADN.

2. The method of claim 1, further comprising:

determining an index tag corresponding to the electronic phone book record and a file ID of the EFIAP recorded in the index tag when determining the email type of the EFEMAIL for a second type according to the email type included in the electronic phone book record of the EFPBR, wherein the second type expresses that the number of the email record of the EFEMAIL is not equal to the number of the name and phone number record of EFADN;

loading an index record of the EFIAP according to a determined file ID of the EFIAP;

updating the email information of the email record; and linking an updated email record with the name and phone number record of the EFADN together according to updated the email information and a record number of the updated email record when the record number of the updated email record is obtained.

3. The method of claim 2, further comprising:

determining whether the record number of the name and phone number record of the EFADN of the contact of the updated email information is included in the email record of the EFEMAIL when the record number of the updated email record is not obtained by the storage device;

updating the index record of the EFIAP according to the record number of the name and phone number record of the EFADN of the contact of the updated email information;

updating the email information of the email record of the EFEMAIL according to the updated email information;

linking the updated email record of the EFEMAIL with the name and phone number record of the EFADN when the record number of the name and phone number record of the EFADN of the contact of the updated email information is included in the email record of the EFEMAIL;

searching for a record number of an email record of an empty content of the EFEMAIL;

deleting link information of the EFIAP of the email record of the empty content with the name and phone number record of the EFADN;

updating the email information of the email record of the empty content according to the updated email information; and linking the updated email record with the name and phone number record of the EFADN.

4. The method of claim 1, further comprising steps for loading the information of the electronic phone book of USIM, wherein the loading step comprises:

determining the number of the electronic phone book records of the EFPBR;

obtaining the information of each electronic phone book record including the name and phone number tag, the email tag, and the index tag of each electronic phone book record, wherein the name and phone number tag provides the file ID of the EFADN, the email tag provides the file ID of the EFEMAIL, and the index tag provides the file ID of the EFIAP;

loading the content of the EFADN, the EFEMAIL, and the EFIAP according to the file IDs of the EFADN, the EFEMAIL, and the EFIAP;

determining whether all the content of the EFADN, the EFEMAIL, and the EFIAP is obtained;

loading all the content of EFADN and saving all the content of the EFADN into the storage device, wherein the content includes the file ID of the EFADN and the information of the each name and phone number record when the content of the EFADN, the EFEMAIL, and the EFIAP is not completely obtained;

loading all the content of the EFEMAIL and saving all the content of the EFEMAIL into the storage device, wherein the content includes the file ID of the EFEMAIL, the email record of the EFEMAIL, and the record number of the EFEMAIL when the type of the email type of the EFEMAIL is determined for the first type according to the email type included in the electronic phone book record of EFPBR; and linking each email record of EFEMAIL with the name and phone number record of the EFADN according to the link information included in each email record of the EFEMAIL.

5. The method of claim 4, further comprising:

loading all the content of the EFIAP and saving the content of the EFIAP into the storage device, wherein the content includes the file ID of the EFIAP and the information of each index record of the EFIAP according to the file ID of the EFIAP when the type of the email type of the EFEMAIL is determined for the second type according to the email type included in the electronic phone book record of the EFPBR;

obtaining the file ID of the EFEMAIL corresponding to the electronic phone book record from EFPBR;

loading all the content of the EFEMAIL and saving all the content of the EFEMAIL into the storage device, wherein the content includes the file ID of the EFEMAIL, the email record of the EFEMAIL, and the record number of the EFEMAIL corresponded to the electronic phone book record of EFPBR;

linking the email record of the EFEMAIL with the name and phone number record of the EFADN together according to the link information included in each email record of the EFEMAIL.

6. The method of claim 4, further comprising:

determining whether all the content of the EFADN, the EFEMAIL, and the EFIAP is completely obtained by determining whether the content of the EFADN, the EFEMAIL, and the EFIAP is an empty content.

7. The method of claim 6, further comprising:

obtaining all information of the electronic phone book from the USIM when all content of the EFADN, the EFEMAIL, and the EFIAP is completely obtained.

8. The method of claim 1, wherein each of the electronic phone book records of the EFPBR corresponds to the name and phone number tag, the email tag, and the index tag, wherein the email tag includes the email type of EFEMAIL and the file ID of EFEMAIL.

9. A non-transitory computer-readable storage medium having stored thereon instructions that, when executed by at least one processor of a communication device, cause the processor to perform a method for managing a electronic phone book of the communication device, the communication device comprising a universal subscriber identity module (USIM), the method comprising:

saving the electronic phone book information loaded from the USIM into a storage device of the communication device, wherein the USIM comprises a plurality of elementary files, and the elementary files comprise an elementary file phone book reference (EFPBR), a plurality of elementary file abbreviated dialing numbers (EFADN), a plurality of elementary file email (EFEMAIL), and a plurality of elementary file index administration pointer (EFIAP), wherein the EFPBR comprise a plurality of electronic phone book records, a plurality of name and phone number tags, a plurality of email tags, and a plurality of index tags, wherein the EFADN comprise a plurality of name and phone number records, wherein the EFEMAIL comprise a plurality of email records, wherein the EFIAP comprise a plurality of index records;

receiving updated email information of contacts in the electronic phone book;

determining a record number of the name and phone number record of the EFADN of the contact of the updated email information, and determining a file identifier (file ID) of the EFADN;

determining a record number of the electronic phone book record of the EFPBR corresponding to the EFADN according to the file ID of the EFADN;

determining a file ID of the EFEMAIL corresponding to the electronic phone book record according to the email tag corresponding to the electronic phone book record and a determined record number of the electronic phone book record;

updating email information of the email record of the EFEMAIL corresponding to a determined name and phone number record according to the updated email information when determining a email type of the EFEMAIL for a first type according to the email type included in the electronic phone book record of the EFPBR, wherein the first type expresses that a number of the email records of the EFEMAIL is equal to a number of the name and phone number records of the EFADN; and linking an updated email record of the EFEMAIL with the name and phone number record of the EFADN.

10. The storage medium of claim 9, wherein the method further comprises:

determining an index tag corresponding to the electronic phone book record and a file ID of the EFIAP recorded in the index tag when determining the email type of the EFEMAIL for a second type according to the email type included in the electronic phone book record of the EFPBR, wherein the second type expresses that the number of the email record of the EFEMAIL is not equal to the number of the name and phone number record of the EFADN;

loading an index record of the EFIAP according to a determined file ID of the EFIAP;

updating the email information of the email record; and linking an updated email record with the name and phone number record of the EFADN together according to updated the email information and a record number of the updated email record when the record number of the updated email record is obtained.

11. The storage medium of claim 10, wherein the method further comprises:

determining whether the record number of the name and phone number record of the EFADN of the contact of the updated email information is included in the email record of the EFEMAIL when the record number of the updated email record is not obtained by the storage device;

updating the index record of the EFIAP according to the record number of the name and phone number record of the EFADN of the contact of the updated email information;

updating the email information of the email record of the EFEMAIL according to the updated email information;

linking the updated email record of the EFEMAIL with the name and phone number record of the EFADN when the record number of the name and phone number record of the EFADN of the contact of the updated email information is included in the email record of the EFEMAIL;

searching for a record number of an email record of an empty content of the EFEMAIL;

deleting link information of the EFIAP of the email record of the empty content with the name and phone number record of the EFADN;

updating the email information of the email record of the empty content according to the updated email information; and linking the updated email record with the name and phone number record of the EFADN.

12. The storage medium of claim 1, wherein the method further comprises steps for loading the information of the electronic phone book of USIM, the loading steps comprising:

determining the number of the electronic phone book records of the EFPBR;

obtaining the information of each electronic phone book record including the name and phone number tag, the email tag, and the index tag of each electronic phone book record, wherein the name and phone number tag provides the file ID of the EFADN, the email tag provides the file ID of the EFEMAIL, and the index tag provides the file ID of the EFIAP;

loading the content of the EFADN, the EFEMAIL, and the EFIAP according to the file IDs of the EFADN, the EFEMAIL, and the EFIAP;

determining whether all the content of the EFADN, the EFEMAIL, and the EFIAP is obtained;

loading all the content of the EFADN and saving all the content of the EFADN into the storage device, wherein the content includes the file ID of the EFADN and the information of the each name and phone number record when the content of the EFADN, the EFEMAIL, and the EFIAP is not completely obtained;

loading all the content of the EFEMAIL and saving all the content of the EFEMAIL into the storage device, wherein the content includes the file ID of the EFEMAIL, the email record of the EFEMAIL, and the record number of the EFEMAIL when the type of the email type of the EFEMAIL is determined for the first type according to the email type included in the electronic phone book record of the EFPBR; and linking each email record of the EFEMAIL with the name and phone number record of the EFADN according to the link information included in each email record of the EFEMAIL.

13. The storage medium of claim 12, and the steps further comprising:
   loading all the content of the EFIAP and saving the content of the EFIAP into the storage device, wherein the content includes the file ID of the EFIAP and the information of each index record of the EFIAP according to the file ID of the EFIAP when the type of the email type of the EFEMAIL is determined for the second type according to the email type included in the electronic phone book record of the EFPBR;
   obtaining the file ID of the EFEMAIL corresponding to the electronic phone book record from the EFPBR;
   loading all the content of the EFEMAIL and saving all the content of the EFEMAIL into the storage device, wherein the content includes the file ID of the EFEMAIL, the email record of the EFEMAIL, and the record number of the EFEMAIL corresponded to the electronic phone book record of EFPBR;
   linking the email record of the EFEMAIL with the name and phone number record of the EFADN together according to the link information included in each email record of the EFEMAIL.

14. The storage medium of claim 12, wherein the method further comprises:
   determining whether all the content of the EFADN, the EFEMAIL, and the EFIAP is completely obtained by determining whether the content of the EFADN, the EFEMAIL, and the EFIAP is an empty content.

15. The storage medium of claim 14, wherein the method further comprises:
   obtaining all information of the electronic phone book from the USIM when all content of the EFADN, the EFEMAIL, and the EFIAP is completely obtained.

16. The storage medium of claim 9, wherein each of the electronic phone book records of the EFPBR corresponds to the name and phone number tag, the email tag, and the index tag, wherein the email tag includes the email type of the EFEMAIL and the file ID of EFEMAIL.

* * * * *